Figure 1:
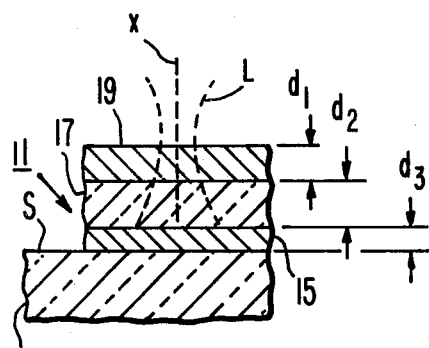

United States Patent [19]

Bell et al.

[11] 4,195,312

[45] Mar. 25, 1980

[54] RECORDER AND ANTIREFLECTIVE RECORD BLANK HAVING AN OPTICALLY PASSIVE TRANSPARENT LAYER

[75] Inventors: Alan E. Bell, East Windsor; Robert A. Bartolini, Trenton, both of N.J.

[73] Assignee: RCA Corporation, New York, N.Y.

[21] Appl. No.: 880,759

[22] Filed: Feb. 24, 1978

[51] Int. Cl.² .................. G01D 15/34; G11B 7/00; H04N 5/76
[52] U.S. Cl. ............... 179/100.1 G; 179/100.3 V; 346/76 L; 346/135.1
[58] Field of Search ............ 346/135, 108, 76 L; 358/128, 127, 129, 297; 365/120, 124, 127; 179/100.3 V, 100.3 G

[56] References Cited

U.S. PATENT DOCUMENTS

| | | | |
|---|---|---|---|
| 3,665,483 | 5/1972 | Becker et al. | 346/1 |
| 4,023,185 | 5/1977 | Bloom et al. | 358/128 |
| 4,097,895 | 6/1978 | Spong | 358/128 |
| 4,101,907 | 7/1978 | Bell et al. | 358/128 |

OTHER PUBLICATIONS

Greenblatt, IBM Tech. Disc. Bulletin, vol. 14, No. 8, p. 2358, 1/72.

*Primary Examiner*—Raymond F. Cardillo, Jr.
*Attorney, Agent, or Firm*—E. M. Whitacre; J. S. Tripoli; J. E. Roehling

[57] ABSTRACT

An optical record blank structure comprises a disc-shaped substrate (e.g., glass), a layer of light-reflective material (e.g., aluminum) overlying a surface of the disc-shaped substrate, a coating of a transparent material (e.g., silicon dioxide) overlying the light-reflective layer and a coating of a moderately absorptive material (e.g., an organic dye such as fluorescein) overlying the dielectric coating. The coating parameters are chosen to establish an antireflective condition to a recording light beam incident on the disc surface. The transparent coating thickness is selected such that the transparent coating is optically passive to the recording light beam, i.e., the thickness of the transparent coating is selected to be an integer multiple of the half-wavelength of the recording light beam wavelength in the transparent material. With this structure the efficiency of energy coupling into the absorptive coating is enhanced by the antireflective condition, the reflective surface of the substrate and the thickness of the transparent coating.

3 Claims, 3 Drawing Figures

RECORDER AND ANTIREFLECTIVE RECORD BLANK HAVING AN OPTICALLY PASSIVE TRANSPARENT LAYER

The Government has rights in this invention pursuant to Contract No. MDA 904-76-C-0429 awarded by the Department of the Army.

The present invention relates generally to a novel high-density information storage medium. More particularly, this invention relates to an information storage medium suitable for use with optical recording and playback methods and apparatus.

In copending U.S. application Ser. No. 668,495, filed on Mar. 19, 1976-Spong, now U.S. Pat. No. 4,097,897, a flat major surface of a disc-shaped substrate is coated with a light-reflective layer. Overlying the reflective layer is a layer of material (e.g., fluorescein) which is highly absorptive for light of a frequency supplied by a recording laser. The coating parameters are chosen to establish an anti-reflection condition for the coated record blank at the recording light frequency.

In yet another copending U.S. application Ser. No. 782,032, filed Mar. 28, 1977 for A. E. Bell, optical recording methods having improved sensitivity have been proposed wherein the efficient coupling of energy from the recording light beam into an absorptive material coating is achieved by construction of the recording medium in the form of a substrate having a surface which is highly reflective at the frequency of the light forming the recording beam. A layer of material transparent at the recording beam light frequency overlies the reflective surface, and a thin layer of material, highly absorptive at the recording beam light frequency, overlies the transparent layer. With both incident light and light reflected from the substrate surface through the transparent layer passing through the thin absorptive layer, the ability to rapidly elevate the temperature of the absorptive layer material to that required for melting to take place is enhanced. The absorptive layer is chosen from materials having high absorptivity and exhibiting long-term stability, such as titanium, platinum and rhodium: The long-term stability of the entire record blank is enhanced since the reflective surface, being subject to oxidation, is protected from environmental exposure by the light transparent layer.

In application of such recording methods and corresponding improved sensitivity mediums, for example, to the high-density recording of video information at "real-time" recording rates, the achievement of an adequate recording sensitivity through the use of a solid state laser, such as GaAs laser diode, requires the replacement of the highly absorptive metal layer with a layer of another material possessing low thermal conductivity, low melting point and high optical absorption at the large wavelength outputs of the solid state lasers.

Pursuant to the principles of the present invention, the efficiency of energy coupling into the absorptive layer is enhanced by choosing a thickness for the absorptive layer which establishes a so-called anti-reflection condition for the coated substrate at the recording beam light frequency. With energy loss via reflection minimized due to the anti-reflection condition establishment, and with energy loss via transmission into the substrate minimized by the reflective surface presence, a highly efficient heating of the absorptive layer to an ablation temperature is realizable.

In accordance with further principles of the present invention, the thickness of the transparent layer is chosen to be of a thickness equal to an integer multiple of the half-wavelength of the laser light output in that transparent material. This choice of thickness for the transparent material assures that light reflected by the reflective layer is in phase with light reflected at the boundary of the transparent layer and the absorptive layer to thereby enhance the sensitivity of the recording process.

In accordance with an illustrative embodiment of the present invention, a surface of a substrate of a disc form (e.g., glass) is processed to a polished flat surface, which is then coated with a layer of a reflective material (e.g., of aluminum). A layer of material (e.g., a dielectric material, such as a silicon dioxide) which is transparent at the light frequency of a monochromatic light source available for recording use (e.g., an argon laser, providing an output at a wavelength of 4880 angstrom units) is deposited over the reflective layer. Finally, the dielectric layer is coated with a thin layer of material (e.g., an organic dye) which is absorptive at the light frequency of the recording light source.

In an illustrative recording system, such as the type described in the aforementioned Spong application, a record blank of the above-described disc form embodying the principles of the present invention is subjected to rotation at a constant speed while a beam of light from a light source (e.g., a laser, providing light at a frequency at which the anti-reflection condition is obtained) is focused on the coated surface of the disc. The intensity of the light beam is controlled in accordance with information to be recorded. Illustratively, the control is effected in accordance with carrier waves modulated in frequency by picture-representative video signals, with the light beam intensity varying between a high level sufficient to effect ablation of the absorptive material and a low level insufficient to effect such ablation, the frequency of the level alternations varying as the video signal amplitude changes.

An information track comprising a succession of spaced pits is thus formed in the coated surface of the disc. The pits appearing in those surface regions exposed to the high level beam, due to melting or vaporizing of the absorptive layer material in response to the high level beam exposure with variations in the length and separation of the pits being representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed, appropriate for "slide" recording purposes.

The result of the above-described recording process is the formation of an information record of a form which facilitates recovery of the recorded information by optical playback processes. The information track of such an information record comprises (1)undisturbed surface regions that exhibit very low reflectance at an appropriate light frequency (due to the anti-reflection thickness choice described previously), alternating with (2) pit regions, formed by the ablation process, that exhibit appreciably higher reflectance at the same light frequency (due to partial or complete removal of the absorptive layer covering the transparent layer and the reflective surface of the substrate, ensuring departure from the anti-reflection condition). A high ratio between the reflectance of the pit regions and the reflectance of the intervening undisturbed regions is readily provided.

In playback operations, a light beam is focused upon the information track of a rotating information record of the above-described type embodying the principles of the present invention. The playback beam has a constant intensity at a level insufficient to effect ablation of the disc coatings, and is of a frequency substantially corresponding to that at which the undisturbed surface regions exhibit an anti-reflection condition. A photodetector, positioned to receive light reflected from the successive regions of the information track as they pass through the path of the focused light, develops a signal representative of the recorded information. A high readout contrast ratio resulting from the large differences in reflectance of the pit regions and the intervening undisturbed track regions, at the light frequency of the playback beam is readily obtained, permitting recovery of the recorded video signals with an excellent signal-to-noise ratio.

Figure 2:
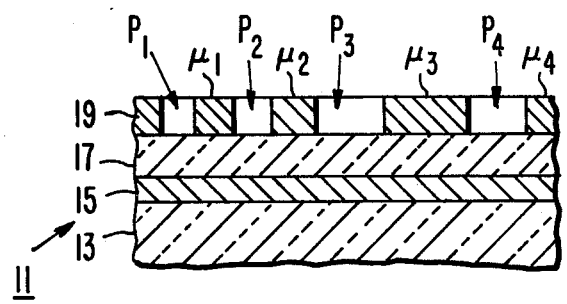
Figure 3:
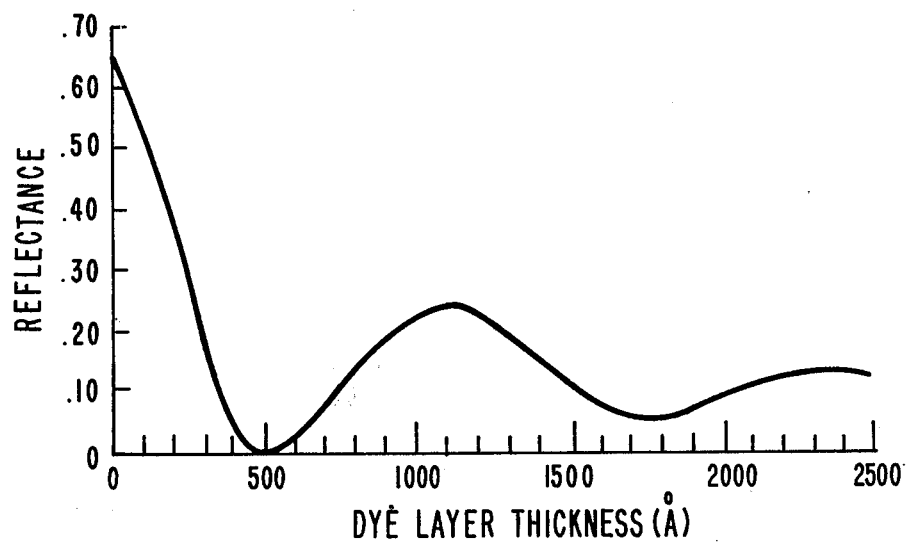

In the accompanying drawings:

FIG. 1 provides a cross-sectional view of a portion of a recording medium, exhibiting a construction in accordance with the principles of the present invention;

FIG. 2 illustrates a cross-sectional view of a portion of the information track of an information record formed from a recording medium of the type shown in FIG. 1 pursuant to the principles of the present invention; and FIG. 3 provides a graph of the relationship between the absorptive surface layer thickness and the reflectance for an illustrative form of the recording medium of FIGS. 1 and 2.

In FIG. 1, a cross-sectional view of a portion of a record blank 11, formed for use in an optical recording system (illustratively, of a type employing an argon laser providing an output wavelength of 4880 angstrom units), shows the construction of a recording medium pursuant to an embodiment of the present invention. The record blank 11 includes a substrate 13, which is illustratively formed in the shape of a disc, a major surface s of which is processed to be polished and flat. The substrate 13 is formed of a material, such as glass, for example, which may be conveniently processed to achieve the desired surface.

Overlying the surface s of the substrate 13 is a thin layer 15 of a material exhibiting a high reflectivity (over at least a given portion of the light spectrum). Illustratively, the reflecting layer 15 is formed of a metal, such as aluminum, for example, deposited on the surface s by an evaporation process.

Overlying the reflecting layer 15 is a layer 17 of material which is light transparent, at least over the aforementioned given portion of the light spectrum. The transparent layer 17 is formed of a dielectric material, such as silicon dioxide, for example, deposited on the reflecting layer 15 by an evaporation process. Transparent layer 17 is of a thickness selected to be equal to an integer number of half wavelengths of the laser light output in silicon dioxide (e.g., of a thickness equal to 1670 A).

Finally, overlying the transparent layer 17 is a thin layer 19 of material which is light absorptive at least over the aforementioned given portion of the light spectrum. Illustratively, the absorptive layer is formed of an organic dye, such as fluorescein, deposited on the transparent layer 17 by an evaporation process.

An advantage of the use, in the illustrated construction of the recording medium, of an absorptive layer overlying a transparent layer which in turn overlies a reflective surface will be recognized by consideration of the effect achieved when a light beam L (of a frequency in the aforementioned given portion of the spectrum) is directed along an axis x normal to the surface s, and focused at or near the surface of the absorptive layer 19. Most of that portion of the incident light which reaches the boundary between the absorptive layer 19 and the transparent layer 17 is not "lost" through transmission into the substrate 13, as would occur in the absence of the reflecting layer 15, but rather is reflected back through the transparent layer 17 into the absorptive layer 19. The consequence is exposure of the absorptive layer 19 to both incident and reflected light. Where it is desired to effect absorptive layer ablation in response to recording light exposure, this avoidance of transmission losses into the interior of the recording medium increases the coupling efficiency of energy from the recording light beam into the absorptive material thereby enhancing recording sensitivity. While a similar avoidance of transmission losses into the interior of the recording medium might be achieved by forming a thicker absorptive layer (i.e., increasing the reflectance thereof), the transmission loss avoidance would be offset by high reflection losses.

For optimum efficiency of coupling of energy from the recording light beam L into the absorptive layer 19, reflection losses are desirably reduced to a low level by choosing the thickness $d_1$ of the absorptive layer 19 to establish a so-called anti-reflection condition for the system at the recording beam frequency. The achievement of an anti-reflection effect by use of thin films of appropriate thickness and optical properties is well known, per se, and applications of the effect with films of transmissive materials are widespread in optical equipment. Formulae which may be useful in arriving at desired optical properties for combinations of the various layers (19, 17, 15) of the FIG. 1 system tht result in the desired anti-reflection condition are well known in the art and a presentation thereof may be found in the above-mentioned Spong application.

When the intensity of the focused light beam L is of sufficient magnitude, material of the absorptive layer 19 is elevated to an ablation temperature, and melting of the material occurs, forming a pit in the surface of the record blank 11. With suitable modulation of the intensity of the beam L in accordance with a recording signal, as successive regions of the record blank 11 pass through the beam path, an information track may be formed comprising spaced pits in regions of the absorptive layer subject to the high intensity beam exposure, separated by undisturbed regions of the absorptive layer that were not subject to such high intensity beam exposure.

FIG. 2 illustrates a portion of an information record formed when the record blank 11 of FIG. 1 is subjected to such controlled beam exposure. As shown in cross-section in FIG. 2, the information track comprises a succession of spaced pits $p_1$, $p_2$, $p_3$, $p_4$ separated by regions $u_1$, $u_2$, $u_3$, $u_4$ in which the surface of the absorptive layer 19 is undisturbed. For illustrative purposes, the depth of each pit is shown as being equal to the thickness of the absorptive layer 19, whereby the reflective layer 15 is wholly uncovered through the transparent layer 17 in the pit regions. As will be discussed subsequently, while such a depth of melting may desirably result in maximization of the readout contrast ratio, it is not essential for good playback results. Thus, in an acceptable alternative to the illustrated form of information record, a residual portion of the absorptive material (with a thickness, of course, less than $d_1$) may overlie the transparent layer 17 in the pit bottoms.

When the light frequency of a playback beam provided by a laser falls in the given spectrum portion for which the disc's layer 19 is highly absorptive and for which the disc's layer 15 is highly reflective, and at or close to the frequency at which the undisturbed regions of the system 19-17-15-13 exhibit the anti-reflection effect, a high readout contrast ratio is realized, permitting video signal recovery with an excellent signal-to-noise ratio. Illustratively, with use of a deviation range of 7-10 MHz, color television signals of an NTSC format have been recovered with a video signal-to-noise ratio of 45-50 (peak-to-peak video to rms noise) for a video bandwidth of 5 MHz.

The graph of FIG. 3 shows that the minimum reflectance for the illustrative system parameter choices for the system of FIG. 1 occurs at a dye layer thickness of approximately 500 angstrom units. Thus, when this thickness value is associated with the illustrative system parameter choices, the record blank of FIG. 1 (and the non-depressed regions of the information record of FIG. 2) exhibits an anti-reflection condition for the argon laser output.

It will be appreciated that where the flat substrate is formed of a temperature sensitive material (e.g., polyvinyl chloride), care must be taken to avoid disturbance of the substrate by the heat generated in the recording process. Under those circumstances, the substrate can be effectively insulated from the heat generated by the recording laser by choosing a thickness for the dielectric layer which is greater than the thermal diffusion length through the dielectric layer, that is, a thickness which is a higher order integer multiple of the half-wavelength of the laser output through the dielectric material.

While the principles of the present invention have been demonstrated with particular regard to the illustrative structures of FIGS. 1 and 2, it will be recognized that various departures from such illustrative structures may be undertaken in practice of the invention. For example, the substrate itself may be formed of material having high reflectivity, eliminating the need for employing a separate reflecting layer in forming a reflective surface underlying the transparent layer. Furthermore, while the invention was particularly described by examples where the absorptive layer was formed of an organic dye, other materials, such as inorganic light absorbing materials (e.g., $PbI_2$) may also be used. For another example, since wideband reflection is not required of the reflecting layer, the metal coating may be supplanted by a single layer of multilayer dielectric reflector. It will also be appreciated that other forms of optical recording (such as pulsed holographic recording) may use the advantageous record blank structure described herein.

What is claimed is:

1. In a radiant energy recording system employing a recording laser providing light of a given frequency; a record blank comprising the combination of:
   a substrate;
   a layer of material exhibiting high reflectivity at said given frequency, said layer overlying a surface of said substrate;
   a first coating, of a thickness equal to an integer multiple of the half-wavelength of the laser light output passing therethrough, exhibiting light transparency at said given frequency, said first coating overlying said layer; and
   a second transmissive coating exhibiting both absorptivity and antireflectivity at said given frequency, said second coating overlying said first coating;
   wherein the antireflectivity of said second coating minimizes energy loss due to reflection, the reflectivity of said layer minimizes energy loss into said substrate and the thickness of said first coating causes light reflected by said layer to be in phase with light reflected at the boundary of the second coating and the first coating thereby effecting an enhancement of the sensitivity of the record blank.

2. The combination in accordance with claim 1 wherein said second coating is formed by an organic dye.

3. The combination in accordance with claim 1 wherein said substrate is in the form of a disc and wherein said light reflective surface comprises a metal layer deposited on a major surface of said disc.

UNITED STATES PATENT AND TRADEMARK OFFICE
CERTIFICATE OF CORRECTION

PATENT NO. : 4,195,312

DATED : March 25, 1980

INVENTOR(S) : Alan E. Bell et al.

It is certified that error appears in the above-identified patent and that said Letters Patent is hereby corrected as shown below:

Column 1, line 15, "4,097,897" should read --4,097,895--.

Column 4, line 42, "tht" should read --that--.

Signed and Sealed this

Twenty-second Day of July 1980

[SEAL]

Attest:

SIDNEY A. DIAMOND

Attesting Officer      Commissioner of Patents and Trademarks